(12) United States Patent
Hwang

(10) Patent No.: US 9,729,841 B2
(45) Date of Patent: Aug. 8, 2017

(54) VIDEO DECODING SYSTEM HAVING COMPENSATION FUNCTION

(75) Inventor: In-Jun Hwang, Yongin (KR)

(73) Assignee: PIXELPLUS CO., LTD., Suwon (KR)

( * ) Notice: Subject to any disclaimer, the term of this patent is extended or adjusted under 35 U.S.C. 154(b) by 599 days.

(21) Appl. No.: 14/360,253

(22) PCT Filed: Jul. 12, 2012

(86) PCT No.: PCT/KR2012/005526
§ 371 (c)(1),
(2), (4) Date: May 22, 2014

(87) PCT Pub. No.: WO2013/022191
PCT Pub. Date: Feb. 14, 2013

(65) Prior Publication Data
US 2014/0328409 A1 Nov. 6, 2014

(30) Foreign Application Priority Data

Aug. 5, 2011 (KR) .................. 10-2011-0078260

(51) Int. Cl.
*H03M 1/12* (2006.01)
*H04N 9/64* (2006.01)
(Continued)

(52) U.S. Cl.
CPC ............ *H04N 9/646* (2013.01); *H04N 5/205* (2013.01); *H04N 7/102* (2013.01); *H04N 9/44* (2013.01); *H04N 9/68* (2013.01)

(58) Field of Classification Search
USPC ....... 348/572, 500, 521, 525, 563, 571, 592, 348/599, 638, 639, 640, 641, 642, 682,
(Continued)

(56) References Cited

U.S. PATENT DOCUMENTS 5,684,540 A * 11/1997 Kitahara ............. H04N 11/002
348/432.1
5,771,072 A * 6/1998 Tokoro .................... H04N 9/12
348/383
(Continued)

FOREIGN PATENT DOCUMENTS

CN 1118558 A 3/1996
CN 1642290 A 7/2005
(Continued)

OTHER PUBLICATIONS

International Search Report for PCT/KR2012/005526 filed on Jul. 12, 2012.

*Primary Examiner* — Jefferey F Harold
*Assistant Examiner* — Mustafizur Rahman

(57) ABSTRACT

The present invention relates to a video decoding system having a compensation function, the video decoding system comprising: one AD converter; a synchronized signal level detector for detecting a synchronized signal level using a digital signal output from the AD converter; a color burst level detector for detecting a color burst level using the digital signal output from the AD converter; a compensation apparatus for compensating the video level and the high frequency components of an analog signal by using information detected by the synchronized signal level detector and the color burst level detector, and for compensating and transmitting a synchronized signal level to the AD converter; and a decoding apparatus for outputting a digital component image signal (YCrCb) using the digital signal output from the AD converter.

14 Claims, 7 Drawing Sheets

(51) Int. Cl.
*H04N 9/68* (2006.01)
*H04N 9/44* (2006.01)
*H04N 5/205* (2006.01)
*H04N 7/10* (2006.01)

(58) Field of Classification Search
USPC ....... 348/441, 443, 444, 450, 453, 454, 464, 348/465; 375/240.25, 345, 219; 370/206
See application file for complete search history.

(56) References Cited

U.S. PATENT DOCUMENTS

| | | | | |
|---|---|---|---|---|
| 5,786,865 | A * | 7/1998 | Ayzenberg | H04N 9/641 348/505 |
| 6,175,550 | B1 * | 1/2001 | van Nee | H04L 1/0002 370/206 |
| 6,219,485 | B1 * | 4/2001 | Choi | H04N 9/455 348/505 |
| 6,441,871 | B1 * | 8/2002 | Hori | H04N 5/08 348/691 |
| 6,483,550 | B1 * | 11/2002 | Murata | H04N 9/64 348/571 |
| 6,522,366 | B1 * | 2/2003 | Onodera | H04N 9/66 348/638 |
| 6,671,002 | B1 * | 12/2003 | Konishi | H03L 7/107 348/725 |
| 6,690,430 | B1 * | 2/2004 | Takeshita | H04N 9/66 348/638 |
| 7,486,741 | B2 * | 2/2009 | Sohng | H04B 10/1141 375/286 |
| 8,619,925 | B2 * | 12/2013 | Takida | H03F 3/189 375/345 |
| 2001/0021051 | A1 * | 9/2001 | Kim | H03K 5/1504 398/147 |
| 2003/0202795 | A1 * | 10/2003 | Garcia | H04B 10/2569 398/147 |
| 2004/0021796 | A1 * | 2/2004 | Fang | H04N 5/185 348/694 |
| 2004/0032535 | A1 * | 2/2004 | Ogawa | H04N 9/78 348/670 |
| 2004/0212730 | A1 * | 10/2004 | MacInnis | H04N 21/44029 348/441 |
| 2005/0030263 | A1 * | 2/2005 | Yamazaki | G09G 3/22 345/75.1 |
| 2005/0128358 | A1 * | 6/2005 | Nakajima | H04N 5/208 348/678 |
| 2006/0197872 | A1 * | 9/2006 | Chen | H03M 1/1028 348/572 |
| 2006/0279801 | A1 * | 12/2006 | Nagai | G06K 15/02 358/453 |
| 2009/0273714 | A1 * | 11/2009 | Liou | H04N 5/148 348/572 |
| 2010/0083340 | A1 * | 4/2010 | Grigorian | H04N 7/108 725/149 |
| 2010/0110299 | A1 * | 5/2010 | Ritter | H04B 3/145 348/607 |
| 2010/0150181 | A1 | 6/2010 | Lee et al. | |
| 2012/0243578 | A1 * | 9/2012 | Manku | H04B 1/0475 375/219 |
| 2012/0320264 | A1 * | 12/2012 | Mombers | H04N 5/53 348/441 |

FOREIGN PATENT DOCUMENTS

| | | |
|---|---|---|
| CN | 1674085 A | 9/2005 |
| CN | 201576307 U | 9/2010 |
| EP | 0 668 702 A2 | 2/1995 |
| JP | 2003-339059 A | 11/2003 |
| KR | 10-0469233 B1 | 1/2005 |
| KR | 10-2010-0069201 A | 6/2010 |
| KR | 10-2010-0071874 A | 6/2010 |

* cited by examiner

VIDEO DECODING SYSTEM HAVING COMPENSATION FUNCTION

TECHNICAL FIELD

The present invention relates to a video decoding system having a compensation function, and more particularly, to a video decoding system capable of performing both a compensation process and a decoding process using one AD converter.

BACKGROUND ART

In general, a video decoding system which receives an analog signal and decodes the analog signal includes a first apparatus for compensating an input signal attenuated by transmission cable characteristics in a transmission process and a second apparatus for converting an analog composite video baseband signal (CVBS) into a digital component video signal (YCrCb).

To perform an input signal compensation process and a video signal conversion process in a general video decoding system, pieces of predetermined digital information are necessary, and thus an AD converter (Analog to Digital Converter) for the first apparatus and an AD converter for the second apparatus are used, respectively.

Even when predetermined digital information required for the input signal compensation process is similar to predetermined digital information required for the video signal conversion process, two AD converters are individually provided, respectively. Therefore, design efficiency of the video decoding system decreases, and fabrication cost rises.

DISCLOSURE

Technical Problem

The object of the present invention is to provide a video decoding system having a compensation function, which has high design efficiency and can be implemented with a single chip by integrating AD converters and respective functional blocks used in an input signal compensation process and a video signal conversion process in the video decoding system.

Technical Solution

The present invention includes one AD converter, a synchronized signal level detector for detecting a synchronized signal level using a digital signal output from the AD converter, a color burst level detector for detecting a color burst level using the digital signal output from the AD converter, a compensation apparatus for compensating a video level and a high frequency component and correcting the synchronized signal level with respect to an analog signal using information detected by the synchronized signal level detector and the color burst level detector, and transmitting the analog signal to the AD converter, and a decoding apparatus for outputting a digital component video signal (YCrCb) using the digital signal output from the AD converter.

Advantageous Effects

According to the present invention, a compensation apparatus and a decoding apparatus may be implemented with a single chip and cost for chip implementation may be reduced by performing a compensation process and a decoding process using one AD converter.

Further, since apparatuses for performing similar functions are integrated into one, efficiency on design is increased. Even when a plurality of video decoding systems which may process a plurality of input signals are implemented, since only one AD converter for one input signal is necessary, fabrication is easy, and fabrication cost is reduced.

BEST MODE

Hereinafter, exemplary embodiments of the present invention will be described with reference to the accompanying drawings.

Figure 1:
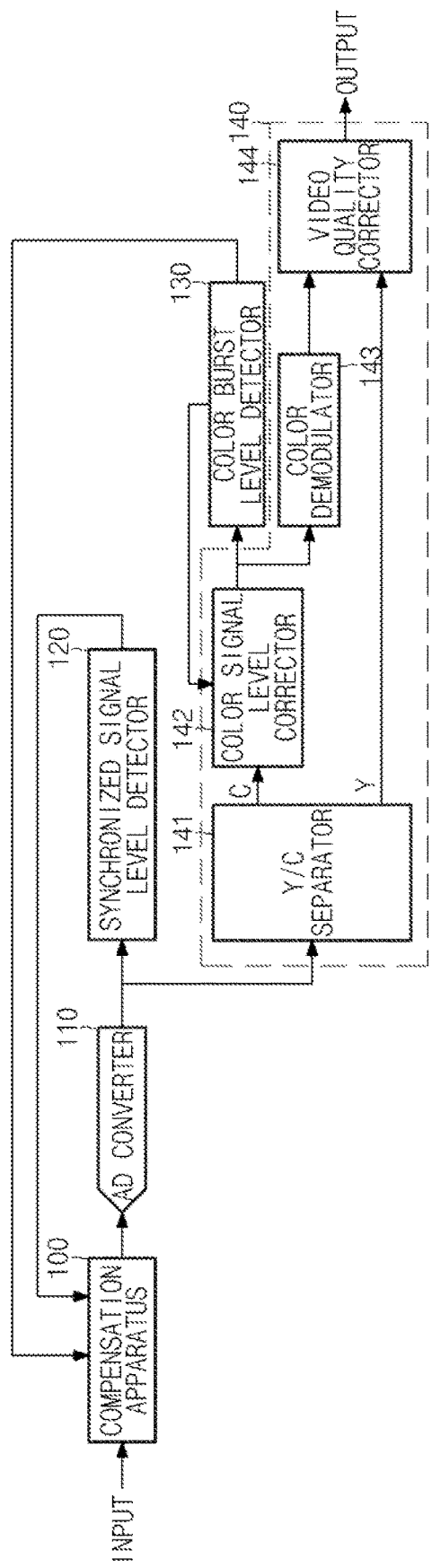
FIG. 1 is a configuration view illustrating a video decoding system according to a first embodiment of the present invention.

FIG. 1 is a configuration view illustrating a video decoding system according to a first embodiment of the present invention.

As illustrated in FIG. 1, a video decoding system may include a compensation apparatus 100, an AD converter (Analog to Digital Converter) 110, a synchronized signal level detector 120, a color burst level detector 130, and a decoding apparatus 140.

The compensation apparatus 100 is an apparatus which receives an analog signal input from the outside, and compensates a video level and a high frequency component and corrects a synchronized signal level with respect to the analog signal. The compensation apparatus 100 performs compensation on the analog signal using pieces of compensation information included in signals output from the synchronized signal level detector 120 and the color burst level detector 130. The compensation information includes a synchronized signal, the synchronized signal level, the color burst level, video existence/non-existence discrimination information, black/color discrimination information, National Television Standards Committee/Phase Alternation Line (NTSC/PAL) discrimination information, and video band discrimination information.

The compensation apparatus 100 may include a video level compensator, a video level corrector, and a high frequency level compensator, and the video level compensator and the video level corrector may be included to be integrated into one apparatus.

The video level compensator is an apparatus which calculates an attenuated amount of the synchronized signal (detected synchronized signal level/synchronized signal standard level) using the synchronized signal level detected by the synchronized signal level detector 120, and compensates a video level of an input signal of the video level compensator according to the calculated attenuated amount of the synchronized signal. The video level corrector is an apparatus for maintaining an accurate synchronized signal level. The video level corrector is an apparatus which calculates the attenuated amount of the synchronized signal using the synchronized signal level detected by the synchronized signal level detector 120, and corrects a synchronized signal level of an input signal of the video level corrector according to the calculated attenuated amount of the synchronized signal. The high frequency level compensator is an apparatus which calculates an attenuated amount of a color burst signal (detected color burst signal level/color burst standard level) using the color burst level detected by the color burst level detector 130, and compensates a high frequency component of an input signal of the high frequency level compensator according to the calculated attenuated amount of the color burst signal.

The video level compensator, the video level corrector, and the high frequency level compensator may respectively perform compensation operation using the synchronized signal, the synchronized signal level, and the color burst level as well as the video existence/non-existence discrimination information, the black and white/color discrimination information, the NTSC/PAL discrimination information, and the video band discrimination information. The video level compensator, the video level corrector, and the high frequency level compensator may be arranged in random order, or may be arranged in series or in parallel.

The AD converter 110 converts an analog signal output from the compensation apparatus 100 into a digital signal.

The synchronized signal level detector 120 detects the synchronized signal and the synchronized signal level from the digital signal converted by the AD converter 110. The video decoding system according to the present invention may include two or more synchronized signal level detectors 120. A synchronized signal level detected by a first synchronized signal level detector may be used to compensate the video level in the video level compensator, and a synchronized signal level detected by a second synchronized signal level detector may be used to correct the synchronized signal level in the video level corrector.

The color burst level detector 130 detects the color burst level from the digital signal converted by the AD converter 110. The video decoding system according to the present invention may include two or more color burst level detectors 130. A color burst level detected by a first color burst level detector may be used to compensate the high frequency component in the high frequency level compensator, and a color burst level detected by a second color burst level detector may be used to correct a level of a color signal in a color signal level corrector to be described in the decoding apparatus 140.

The video existence/non-existence discrimination information, the black and white/color discrimination information, the NTSC/PAL discrimination information, and the video band discrimination information may be detected by the synchronized signal level detector 120 or the color burst level detector 130.

The decoding apparatus 140 includes a Y/C separator 141 which separates a luminance signal Y and a color signal C from the digital signal converted by the AD converter 110, a color signal level corrector 142 which actively corrects a level of the color signal C using the color burst level detected by the color burst level detector 130, a color demodulator 143 which demodulates the corrected color signal C, and an video quality corrector 144 which corrects video quality of the luminance signal Y and a signal demodulated by the color demodulator 143, and outputs a digital component video signal. The color signal level corrector 142 may be combined with the high frequency level compensator to be used as one apparatus in the compensation apparatus 100. At this time, since the correction for the color signal has been previously performed in the compensation apparatus 100, without correction by the color signal level corrector 142, the color signal divided by the Y/C separator 141 may be directly input to the color burst level detector 130, and the color demodulator 143 may also directly receive the color signal divided by the Y/C separator 141 and perform demodulation operation.

Accordingly, the color burst level detector 130 may detect the color burst level from the digital signal output from the AD converter 110, detect the color burst level from the digital signal compensated by the color signal level corrector 142, or detect the color burst level from the digital signal divided by the Y/C separator 141.

The present invention may include the synchronized signal level detector 120 and the color burst level detector 130 which detect various pieces of information from the signal compensated and corrected by the compensation apparatus 100 and feeds back the detected information to the compensation apparatus 100 to perform active compensation and correction.

Figure 2:
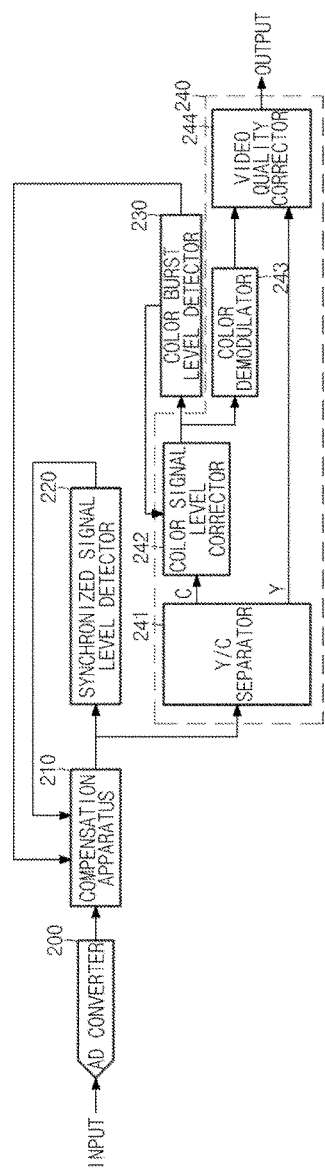
FIG. 2 is a configuration view illustrating a video decoding system according to a second embodiment of the present invention.

FIG. 2 is a configuration view illustrating a video decoding system according to a second embodiment of the present invention.

As illustrated in FIG. 2, an AD converter 200, a compensation apparatus 210, a synchronized signal level detector 220, a color burst level detector 230, and a decoding apparatus 240 of FIG. 2 correspond to the AD converter 110, the compensation apparatus 100, the synchronized signal level detector 120, the color burst level detector 130, and the decoding apparatus 140 of FIG. 1, respectively.

Merely, arrangement of the AD converter 200 and the compensation apparatus 210 of FIG. 2 are changed, and thus input and output signals thereof are differentiated.

That is, an input analog signal is firstly converted into a digital signal by the AD converter 200, and the compensation apparatus 210 performs compensation and correction on the digital signal converted by the AD converter 200.

The compensation apparatus 210 compensates a video level and a high frequency component of the digital signal converted by the AD converter 200, and corrects a synchronized signal level of the digital signal. Like the compensation apparatus 100 of FIG. 1, the compensation apparatus 210 compensates the digital signal using the synchronized signal, the synchronized signal level, the video existence/non-existence discrimination information, the black and white/color discrimination information, the NTSC/PAL discrimination information, the video band discrimination information, or the like, and includes the video level compensator, the video level corrector, and the high frequency level compensator.

The digital signal output from the compensation apparatus 210 is input to the synchronized signal level detector 220 and the color burst level detector 230, and the synchronized signal level detector 220 and the color burst level detector 230 detect various pieces of information from the input digital signal and feeds back the detected information to the compensation apparatus 210, so that the compensation apparatus 210 may perform active compensation and correction. The video decoding system according to the present invention may include two or more synchronized signal level detectors or two or more color burst level detectors. Signals detected by the respective synchronized signal level detectors may be used in the video level compensator and the video level corrector, respectively, and signals detected by the respective color burst level detectors may be used in the high frequency level compensator and the color signal level corrector.

On the other hand, the decoding apparatus 240 receives the digital signal output from the compensation apparatus 210 and outputs a digital component video signal.

As described above, the compensation apparatus 100 of FIG. 1 receives the analog signal as an input signal and the compensation apparatus 210 of FIG. 2 receives the digital signal as an input signal. However, the synchronized signal level detectors 120 and 220 and the color burst level detectors 130 and 230 of FIGS. 1 and 2 always receive the digital signals as input signals.

Figure 3:
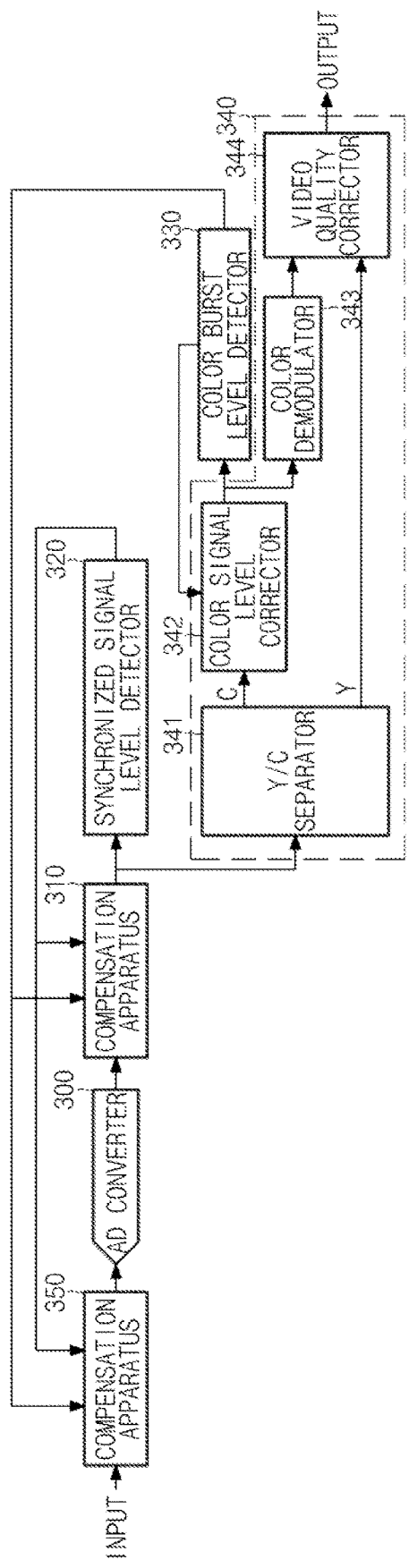
FIG. 3 is a configuration view illustrating a video decoding system according to a third embodiment of the present invention.

FIG. 3 is a view illustrating a video decoding system according to a third embodiment of the present invention.

The video decoding system according to the present invention may include two or more compensation apparatuses. That is, the video decoding system having a form in which the compensation for the analog signal illustrated in FIG. 1 and the compensation for the digital signal illustrated in FIG. 2 are combined may be implemented.

As illustrated in FIG. 3, an AD converter 300, a compensation apparatus 310, a synchronized signal level detector 320, a color burst level detector 330, and a decoding apparatus 340 of FIG. 3 correspond to the AD converter 200, the compensation apparatus 210, the synchronized signal level detector 220, the color burst level detector 230, and the decoding apparatus 240 of FIG. 2, respectively.

Here, a second compensation apparatus 350 is additionally included in an input terminal of the AD converter 300. Since the second compensation apparatus 350 corresponds to the compensation apparatus 100 of FIG. 1, the second compensation apparatus 350 is an apparatus which receives an input analog signal and compensates a video level, a synchronized signal level, and a high frequency component of the analog signal, and the second compensation apparatus 350 performs compensation using the synchronized signal level and the color burst level detected by the synchronized signal level detector 320 and the color burst level detector 330.

That is, in the video decoding system according to the third embodiment, when the analog signal is input, the compensation is performed on the analog signal which is the input signal of the video decoding system in the second compensation apparatus 350, and the compensation is performed on the digital signal converted by the AD converter 300 in the compensation apparatus 310.

Accordingly, among the compensations for the video level, the synchronized signal level, and the high frequency component with respect to the input signal, the video decoding system according to the present invention may perform the compensations on the analog signal in part, and perform the compensations on the digital signal in the other part.

FIG. 4 illustrates a video decoding system according to a first embodiment of the present invention in detail.

Figure 4A:
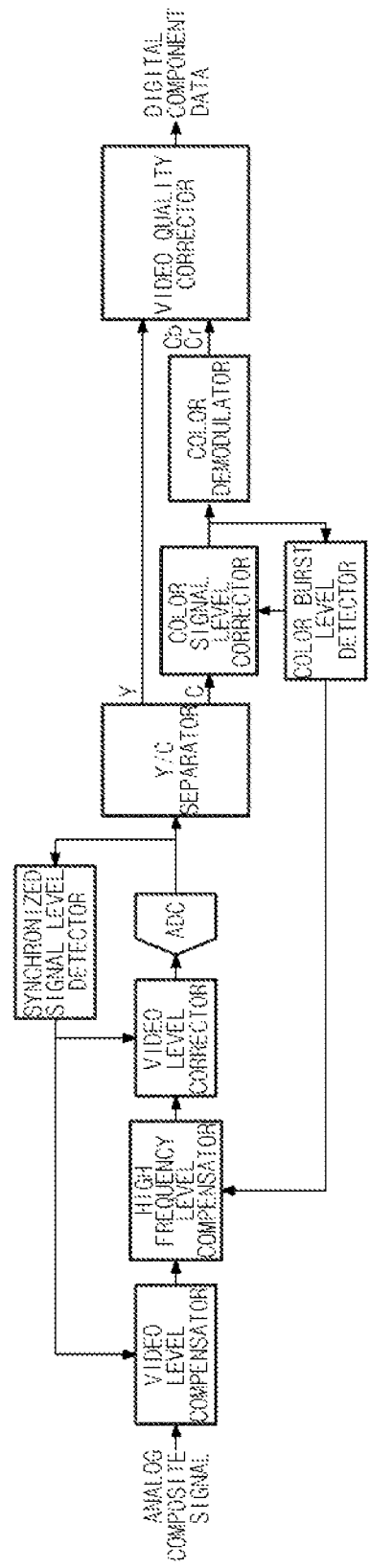
FIG. 4 illustrates a video decoding system according to a first embodiment of the present invention in detail.

As illustrated in FIG. 4(a), since a video level compensator, a high frequency level compensator, and a video level corrector of a compensation apparatus 100 may be connected in random order, an output signal of the video level compensator is used as an input signal of the high frequency level compensator, and an output signal of the high frequency level compensator is used as an input signal of the video level corrector.

An output signal of the video level corrector is input to an AD converter, and a synchronized signal, a synchronized signal level, a color burst level, video existence/non-existence discrimination information, black and white/color discrimination information, NTSC/PAL discrimination information, the video band discrimination information, and the like are detected from a digital signal converted by the AD converter.

Figure 4B:
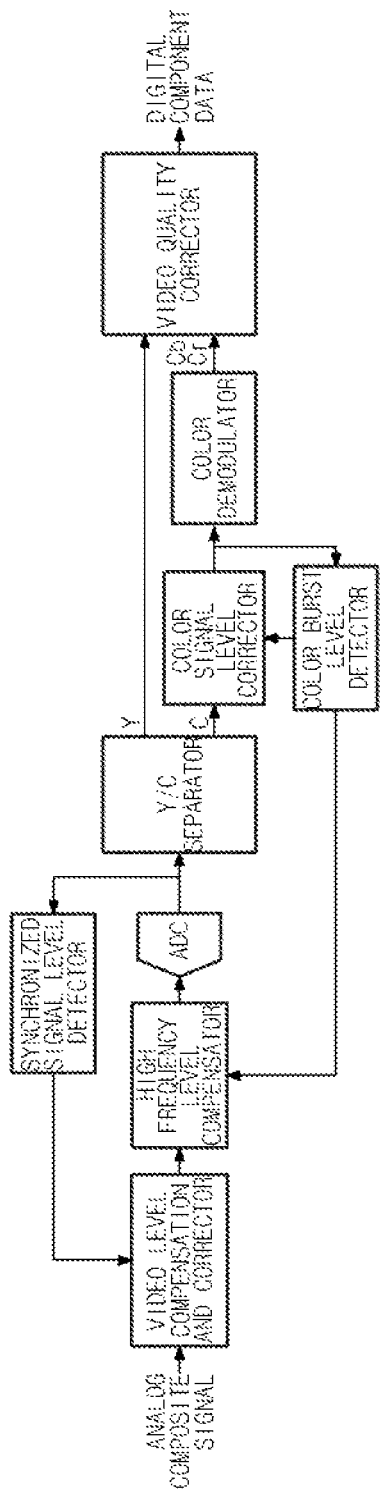

As illustrated in FIG. 4(b), since the video level compensator and the video level corrector may be implemented with one apparatus, the form in which a video level compensation and corrector and the high frequency level compensator are connected is included in the compensation apparatus 100.

Figure 4C:
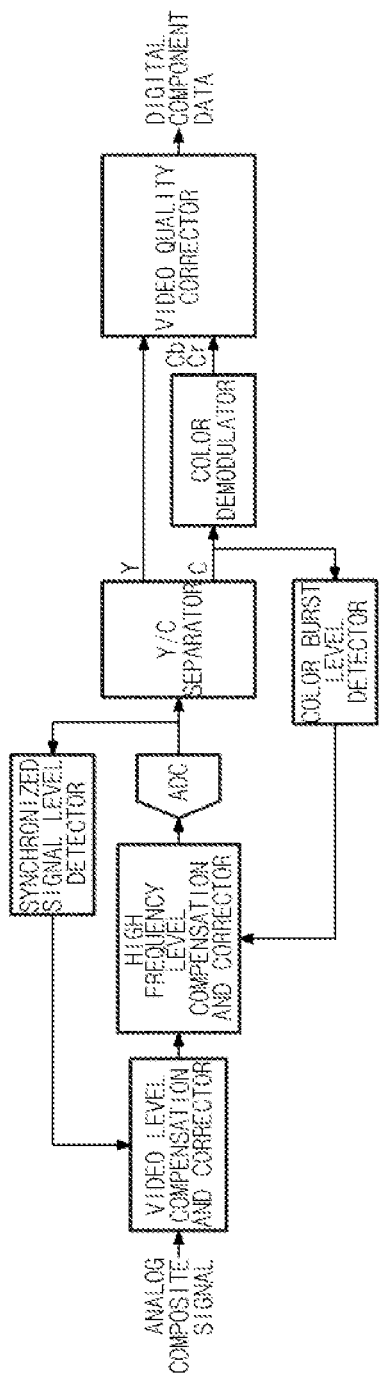

As illustrated in FIG. 4(c), since the video level compensator and the video level corrector may be implemented with one apparatus, a video level compensation and corrector may be included. Since the color signal level corrector is combined with the high frequency level compensator to be implemented with one apparatus, a high frequency level compensation and corrector in which the color signal level corrector and the high frequency level compensator are combined may be included in the video decoding system.

Figure 5:
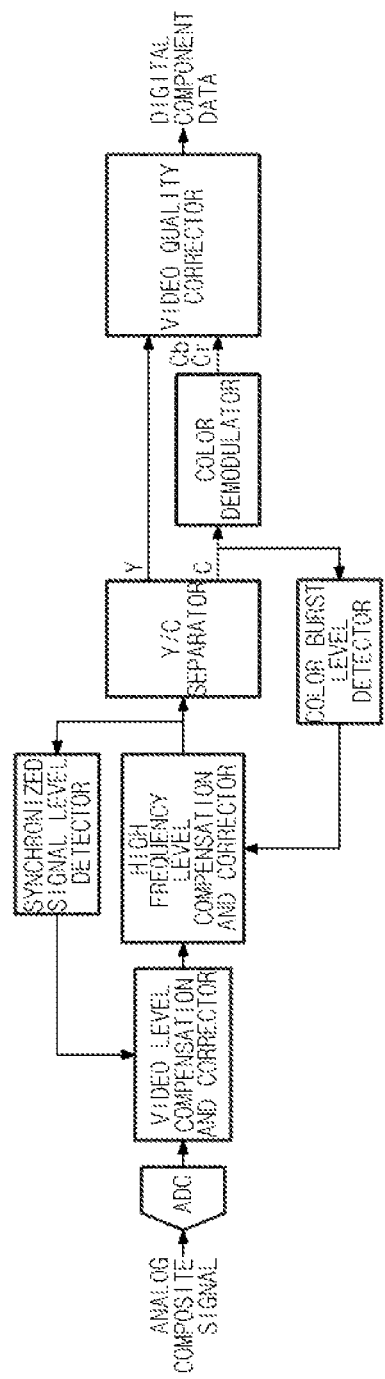
FIG. 5 illustrates a video decoding system according to a second embodiment of the present invention in detail.

FIG. 5 illustrates a video decoding system according to a second embodiment of the preset invention in detail.

As illustrated in FIG. 5, a digital signal output from an AD converter 200 is input to a compensator apparatus 210, and the compensator apparatus 210 may be included in the video decoding system in a form in which a video level compensation and corrector, in which the video level compensator and the video level corrector are implemented with one, and a high frequency level compensation and corrector, in which the color signal level corrector and the high frequency level compensator are combined, are connected.

The present invention may be implemented with a processor-readable code in a processor-readable recording medium. The processor-readable recording medium includes all kinds of recording apparatuses in which processor-readable data is stored. The examples of the processor-readable recording medium include a ROM, a RAM, a CD-ROM, a magnetic tape, a floppy disc, an optical data storage device, or the like. The processor-readable recording medium is distributed in computer systems connected through a network, and the processor-recordable code is stored and executed in a distribution manner.

The foregoing exemplary embodiments and advantages are merely exemplary and are not to be construed as limiting the present inventive concept. The description of the exemplary embodiments is intended to be illustrative, and not to limit the scope of the claims, and many alternatives, modifications, and variations will be apparent to those skilled in the art.

INDUSTRIAL APPLICABILITY

The video decoding system according to an embodiment of the present invention may integrate functional blocks for performing video decoding into one to improve productivity with high design efficiency, and the video decoding system may be further implemented with a signal chip to be suitable for small electronic apparatuses having a video reproduction function.

The invention claimed is:

1. A video decoding system which receives an analog signal, the video decoding system comprising:
   one AD converter (Analogue to Digital Converter);
   a synchronized signal level detector configured to detect a synchronized signal level using a digital signal output from the AD converter;
   a color burst level detector configured to detect a color burst level using the digital signal output from the AD converter;

a compensation apparatus configured to compensate a video level and a high frequency component and correct the synchronized signal level with respect to an analog signal using information detected by the synchronized signal level detector and the color burst level detector, and transmit the analog signal to the AD converter; and a decoding apparatus configured to output a digital component video signal (YCrCb) using the digital signal output from the AD converter.

2. The video decoding system according to claim 1, wherein the decoding apparatus includes:
   a Y/C separator configured to divide a color signal from the digital signal output from the AD converter; and
   a color signal level corrector configured to correct a level of the color signal with respect to the divided color signal using the color burst level.

3. The video decoding system according to claim 1, wherein the compensation apparatus compensates the video level and the high frequency component and corrects the synchronized signal level with respect to the analog signal using at least one among video existence/non-existence discrimination information, black/color discrimination information, NTSC/PAL discrimination information, and video band discrimination information.

4. The video decoding system according to claim 1, wherein the compensation apparatus includes:
   a video level compensator configured to compensate a video level of an input signal using the synchronized signal level detected by the synchronized signal level detector;
   a video level corrector configured to correct a synchronized signal level of an input signal using the synchronized signal level detected by the synchronized signal level detector; and
   a high frequency level compensator configured to compensate a high frequency component of an input signal using the color burst level detected by the color burst level detector.

5. The video decoding system according to claim 4, further comprising a second synchronized signal level detector configured to detect a synchronized signal level using the digital signal output from the AD converter,
   wherein the video level compensator compensates the video level using a signal detected by the synchronized signal level detector, and the video level corrector corrects the synchronized signal level using a signal detected by the second synchronized signal level detector.

6. The video decoding system according to claim 4, further comprising a second color burst level detector configured to detect a color burst level using the digital signal output from the AD converter,
   wherein the high frequency level compensator compensates the high frequency component using a signal detected by the second color burst level detector.

7. The video decoding system according to claim 4, wherein the video level compensator, the video level corrector, and the high frequency level compensator are connected in series in random order.

8. A video decoding system comprising:
   one AD converter (Analogue to Digital Converter) configured to convert an analog signal into a digital signal;
   a compensation apparatus configured to compensate a video level and a high frequency component and correct a synchronized signal level with respect to the digital signal;
   a synchronized signal level detector configured to detect the synchronized signal level using a signal output from the compensation apparatus;
   a color burst level detector configured to detect a color burst level using the signal output from the compensation apparatus; and
   a decoding apparatus configured to output a digital component video signal (YCrCb) using the signal output from the compensation apparatus,
   wherein the compensation apparatus compensates the video level and the high frequency component and corrects the synchronized signal level with respect to the digital signal using information detected from the synchronized signal level detector and the color burst level detector.

9. The video decoding system according to claim 8, wherein the decoding apparatus includes:
   a Y/C separator configured to divide a color signal from the signal output from the compensation apparatus; and
   a color signal level corrector configured to correct a level of the color signal with respect to the divided color signal using the color burst level.

10. The video decoding system according to claim 8, wherein the compensation apparatus compensates the video level and the high frequency component and corrects the synchronized signal level with respect to the digital signal using at least one among video existence/non-existence discrimination information, black/color discrimination information, NTSC/PAL discrimination information, and video band discrimination information.

11. The video decoding system according to claim 8, further comprising a second compensation apparatus configured to receive a second analog signal, compensate a video level and a high frequency component and correct a synchronized signal level with respect to the second analog signal using information detected from the synchronized signal level detector and the color burst level detector, output the analog signal, and feeds back to the analog signal to the AD converter,
   wherein the second analog signal is an input signal of the video decoding system.

12. The video decoding system according to claim 8, wherein the compensation apparatus includes:
   a video level compensator configured to compensate a video level of an input signal using the synchronized signal level detected by the synchronized signal level detector;
   a video level corrector configured to correct a synchronized signal level of an input signal using the synchronized signal level detected by the synchronized signal level detector; and
   a high frequency level compensator configured to compensate a high frequency component of an input signal using the color burst level detected by the color burst level detector.

13. The video decoding system according to claim 12, further comprising a second synchronized signal level detector configured to detect a synchronized signal level using the signal output from the compensation apparatus,
   wherein the video level compensator compensates the video level using a signal detected by the synchronized signal level detector, and the video level corrector corrects the synchronized signal level using a signal detected by the second synchronized signal level detector.

14. The video decoding system according to claim 12, further comprising a second color burst level detector configured to detect a color burst level using the signal output from the compensation apparatus,
    wherein the high frequency level compensator compensates the high frequency component using a signal detected from the second color burst level detector.

* * * * *